(12) United States Patent
Umemoto et al.

(10) Patent No.: US 6,668,796 B2
(45) Date of Patent: Dec. 30, 2003

(54) INTERNAL COMBUSTION ENGINE CONTROL FOR JET PROPULSION TYPE WATERCRAFT

(75) Inventors: Hideki Umemoto, Tokyo (JP); Manabu Gohou, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,805

(22) Filed: Aug. 19, 2002

(65) Prior Publication Data

US 2003/0145826 A1 Aug. 7, 2003

(30) Foreign Application Priority Data

Feb. 4, 2002 (JP) ........................................ 2002-027012

(51) Int. Cl.[7] .............................................. F02D 41/00
(52) U.S. Cl. .................. 123/350; 123/396; 123/406.59
(58) Field of Search ................................ 123/350, 349, 123/351, 396, 398, 406.59

(56) References Cited

U.S. PATENT DOCUMENTS 3,752,252 A * 8/1973 Sakakibara ................. 180/176
4,756,378 A * 7/1988 Takei .......................... 180/179
6,159,059 A   12/2000 Bernier et al.

* cited by examiner

Primary Examiner—Bibhu Mohanty
(74) Attorney, Agent, or Firm—Sughrue Mion, PLLC

(57) ABSTRACT

In order to provide an internal combustion engine control unit for a jet propulsion type watercraft which can control an internal combustion engine so that a rider can perform risk avoidance safely, a throttle open degree detector 22 which detects a state of the throttle operated by a rider, and a controller 300 which, when the throttle open degree detected by the throttle open degree detector 22 is a predetermined value or lower, keeps the rotation speed of the internal combustion engine 2 at a predetermined value for a predetermined period of time after the throttle open degree has reached the predetermined value or lower, are provided.

7 Claims, 5 Drawing Sheets

INTERNAL COMBUSTION ENGINE CONTROL FOR JET PROPULSION TYPE WATERCRAFT

BACKGROUND OF THE INVENTION

1. Field of the Invention

The present invention relates to an internal combustion engine control unit for a jet propulsion type watercraft that is powered by a jet propulsion force, and more particularly to a personal watercraft (PWC) which is a jet propulsion type watercraft.

2. Description of the Background Art

FIG. 4 is a perspective view showing the general construction of a PWC which is a jet propulsion type watercraft as disclosed in, for example, U.S. Pat. No. 6,159,059. In the figure, reference number 1 denotes a hull of a PWC; 2 an internal combustion engine which is controlled by an internal combustion engine control unit (ECU, not shown) and that generates a jet propulsion force optimum for driving the PWC, thereby allowing the hull 1 to run. Reference number 3 denotes a throttle valve which adjusts a throttle of the engine 2; 4 an impeller which is directly connected to the engine 2 and makes water drawn from the front of the hull 1 function as a jet propulsion force; 5 a spouting nozzle which spouts jet water generated by the impeller 4; and 6 a steering nozzle which changes the direction of jet water spouted from the spouting nozzle 5.

Reference number 7 denotes a steering handle which steers the direction of the hull 1 and that is coupled with the steering nozzle 6 through a steering cable 9, and it is possible to stir the hull 1 by changing the spouting direction of jet water. Reference number 8 denotes a throttle lever which is coupled with the throttle valve 3 through a throttle cable 10 and can adjust the throttle. The steering handle 7 and the steering nozzle 6 can be coupled not only in the above-mentioned mechanical manner but also in an electric manner such that, for example, a turning angle position of the steering handle 7 is detected, and the steering nozzle 6 is moved by a motor based on the detected signal.

Next, the movement for changing the traveling direction of the hull 1 by a rider who operates the steering handle 7 will be explained with reference to FIG. 5. As shown in FIG. 5A, when the traveling direction of PWC is straight, the rider keeps the steering handle 7 vertically with respect to the traveling direction of PWC. Here, the steering nozzle 6 coupled with the steering handle 7 through the steering cable 9 is set exactly backward, and jet water is spouted backward to generate a jet propulsion force, thereby moving the PWC to move straight ahead.

On the other hand, as shown in FIG. 5B, in the case where it is intended to change the traveling direction of PWC to the left, when the rider turns the steering handle 7 to the left, the steering nozzle 6 moves to the right, and the spouting direction of jet water changes to the right, whereby the traveling direction of PWC can be changed to the left. Also, as shown in FIG. 5C, in the case where it is intended to change the traveling direction of PWC to the right, when the rider turns the steering handle 7 to the right, the steering nozzle 6 moves to the left, and the spouting direction of jet water changes to the left, whereby the traveling direction of PWC can be changed to the right.

In general, it is arranged that the engine rotation speed is defined by a throttle operation performed by the rider. When the rider operates the throttle to open, the engine rotation speed is increased. Thus, the jet propulsion force of PWC is increased, whereby the jet propulsion force is enhanced to allow the PWC to run faster. On the other hand, when the rider operates the throttle to close, the engine rotation speed is in the idle state where it is low. Thus, the jet propulsion force of PWC is reduced, and the running speed is therefore decreased gradually to the state that the PWC stops.

The internal combustion engine control unit (ECU) controls ignition timing, an amount of fuel supply (an amount of fuel spouting and jetting timing), and an amount of auxiliary intake air for the optimum engine performance and characteristics with respect to the degree of opening the throttle, such that the rider can operate and drive the PWC easily.

In the conventional PWC, as the operation inherent to PWC, in order to change the traveling direction of the hull 1, it is necessary to change the spouting direction of jet water. Such can be achieved by operating the steering handle 7. However, when the jet water does not have a propulsion force reaching a predetermined value, the traveling direction of PWC cannot be changed. In other words, it is necessary to operate the steering handle 7 under the condition where the throttle is opened and the engine rotates at a predetermined rotation speed or higher (the state that a jet propulsion force exists). However, even when the steering handle 7 is operated in the state that no jet propulsion force exists, there is an operational performance that it is impossible to change the traveling direction of the hull 1.

When some risk is realized ahead in running, the steering handle 7 is generally turned to the right or to the left so as to change the traveling direction of PWC to avoid the risk. Here, when the engine rotation speed reaches a predetermined value, there is a jet propulsion force enough to change the traveling direction of PWC by the steering handle 7, whereby the risk can be avoided. However, in the case where the risk is recognized when the throttle is nearly closed in the idle state, there was a problem that the risk cannot be avoided because, nevertheless the hull 1 runs at a certain speed by a remaining power depending on the engine rotation speed, a jet propulsion force enough to change the traveling direction of PWC by the steering handle 7 is not obtained.

In this case, it is necessary to open the throttle in addition to the steering handle operation. However, when a rider, especially a beginner, encounters a risk suddenly, he/she operates only the steering handle 7 in a fluster and forgets to open the throttle to generate the jet propulsion force, so that the risk cannot be avoided and a collision, for example, may occur. The PWC becomes popular because of the easier operation and the comfort, and the number of beginners increases, which also increases the number of this kind of accidents.

Further, when a watercraft gets to the shore, it is necessary to adjust the watercraft speed by performing a subtle throttle opening operation. However, it is difficult for a beginner to get to the shore slowly in a stable manner, and the watercraft may bump against the quay, whereby an impact is likely given.

SUMMARY OF THE INVENTION

The present invention has been made to overcome the above-described problems. An object of the present invention is to provide an internal combustion engine control unit for a jet propulsion type watercraft which can control an internal combustion engine so that a rider can avoid risks safely.

The internal combustion engine control unit for a jet propulsion type watercraft in accordance with the present invention, includes a throttle operation state detector which detects a state of the throttle operated by a rider, and a controller which, when the throttle open degree detected by the throttle operation state detector is a predetermined value or lower, keeps the rotation speed of the internal combustion engine at a predetermined value for a predetermined period of time after the throttle open degree has reached the predetermined value or lower. Thus, even when the watercraft is running in a state that a jet propulsion force enough to change the traveling direction by a steering handle is not obtained, the extra jet propulsion force which can change the traveling direction can be added quickly, so that the rider can perform the risk avoidance safely.

The internal combustion engine control unit of the present invention may further include an ignition timing controller which controls ignition timing for the internal combustion engine and a fuel supplying amount controller which controls a fuel supplying amount supplied to the internal combustion engine, whereby the rotation speed of the internal combustion engine is increased by using at least one of the ignition timing controller and the fuel supplying amount controller. Thus, even when the watercraft is running without a jet propulsion force enough to change the traveling direction of the watercraft by using a steering handle, the extra jet propulsion force which can change the traveling direction of the watercraft can be added quickly so that the rider can perform the risk avoidance safely.

In addition, the ignition timing is controlled to be earlier than usual. Thus, even when the watercraft is running without a jet propulsion force enough to change the traveling direction of the watercraft by using a steering handle, the extra jet propulsion force which can change the traveling direction of the watercraft can be added quickly so that the rider can perform the risk avoidance safely.

The fuel supplying amount may be controlled to be larger than usual. Thus, even when the watercraft is running without a jet propulsion force enough to change the traveling direction of the watercraft by using a steering handle, the extra jet propulsion force which can change the traveling direction of the watercraft can be added quickly so that the rider can perform the risk avoidance safely.

In the present invention, the fuel supplying amount is controlled by making the fuel supplying timing earlier than usual. Thus, even when the watercraft is running without a jet propulsion force enough to change the traveling direction of the watercraft by using a steering handle, the extra jet propulsion force which can change the traveling direction of the watercraft can be added quickly so that the rider can perform the risk avoidance safely.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

The present invention will be described in detail with reference to the accompanying drawings.

Figure 1:
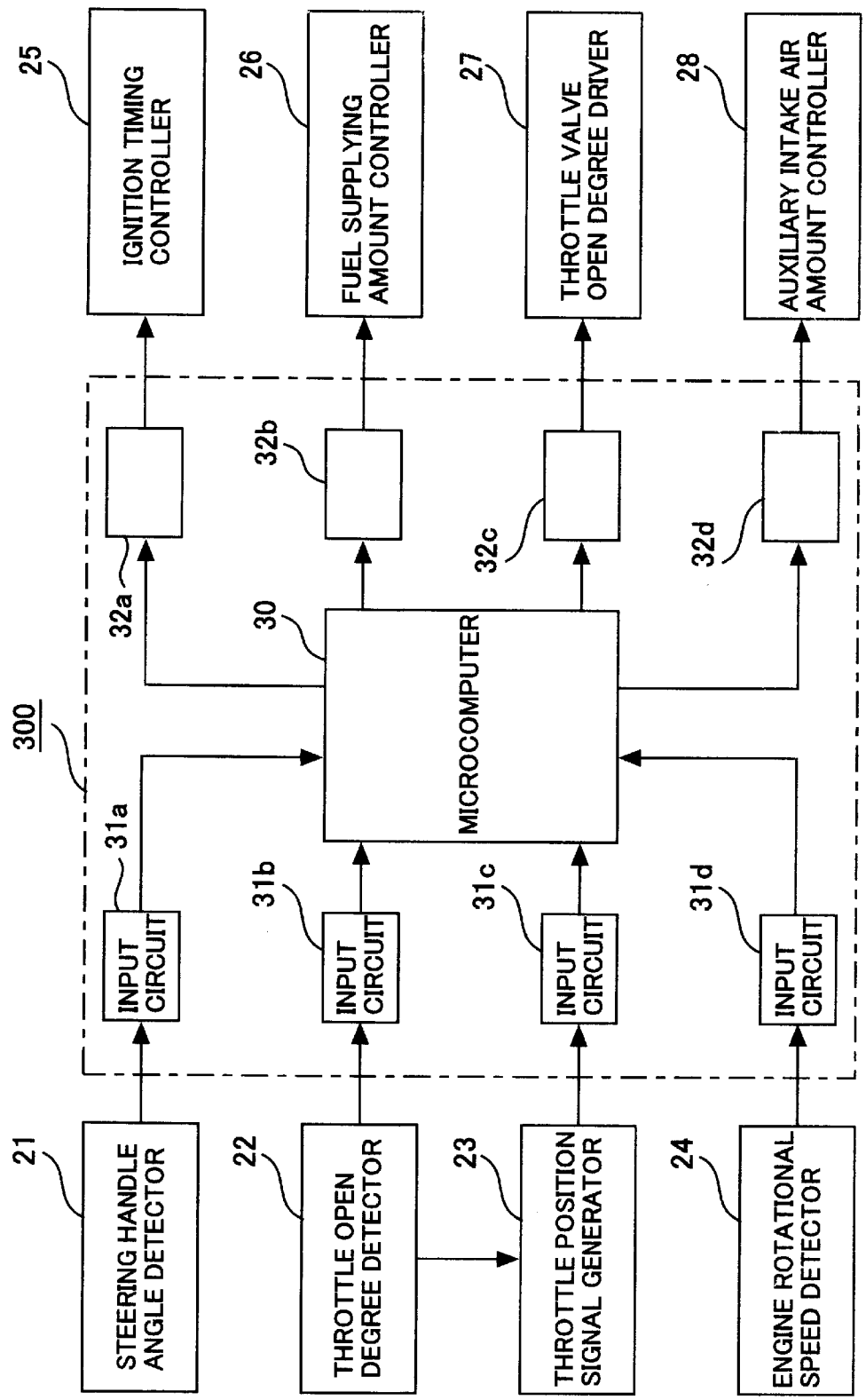
FIG. 1 is a block diagram of the configuration of an internal combustion engine control unit for a jet propulsion type watercraft according to a preferred embodiment of the present invention.
Figure 2:
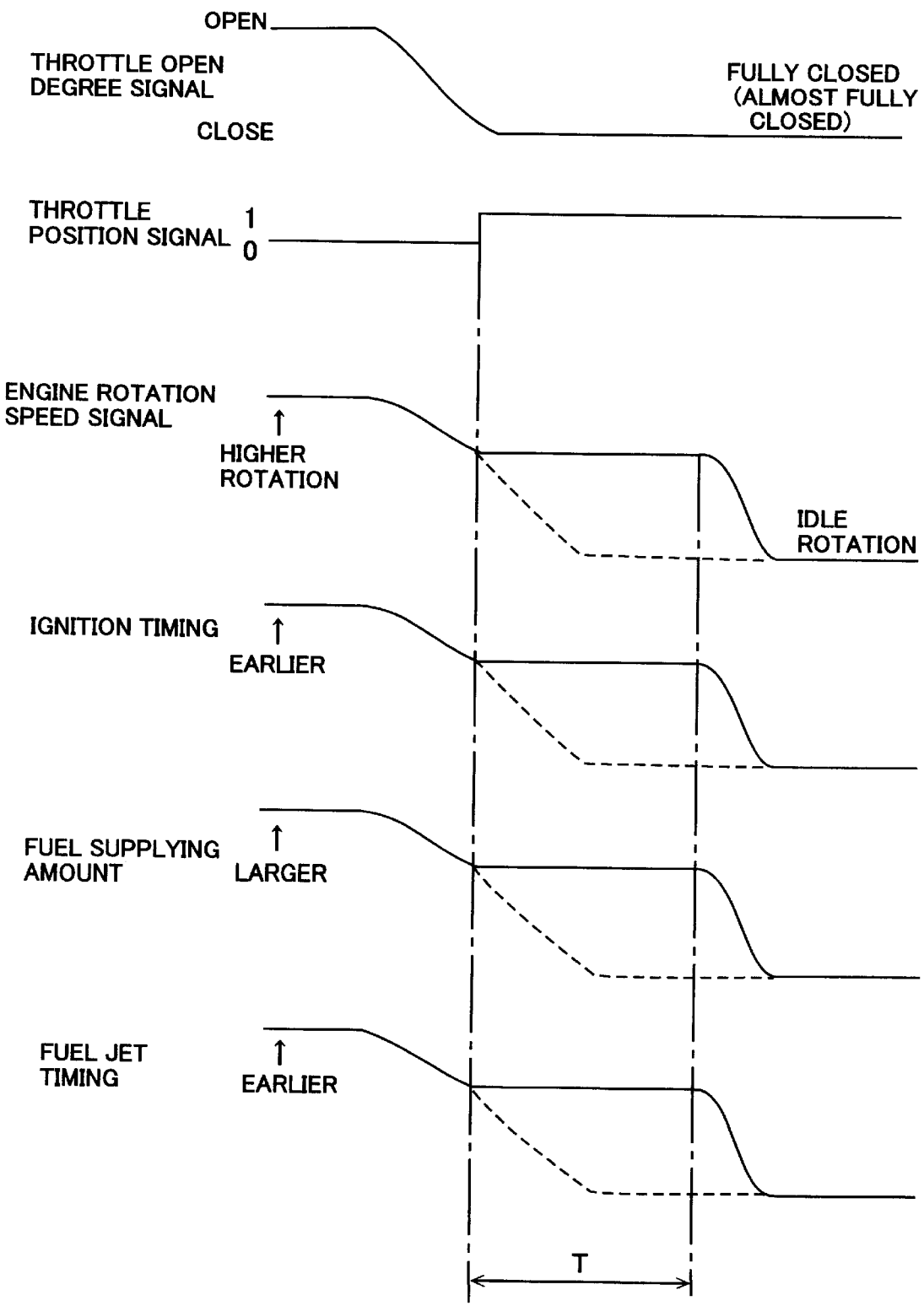
FIG. 2 is a time-chart showing the movement of the internal combustion engine control unit for a jet propulsion type watercraft according to the preferred embodiment of the present invention.
Figure 3:
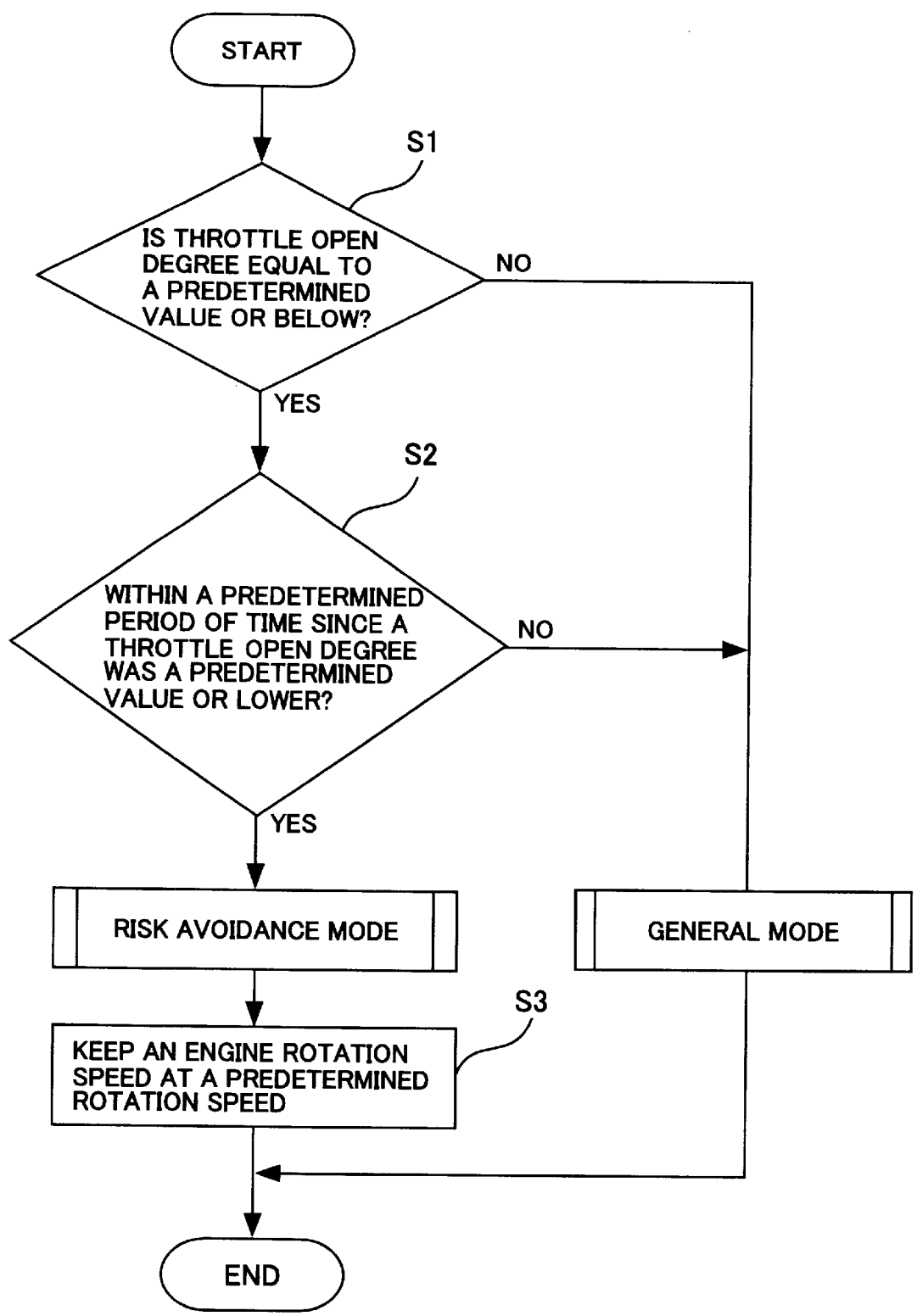
FIG. 3 is a flowchart showing the movement of the internal combustion engine control unit for a jet propulsion type watercraft according to the preferred embodiment of the present invention.
Figure 4:
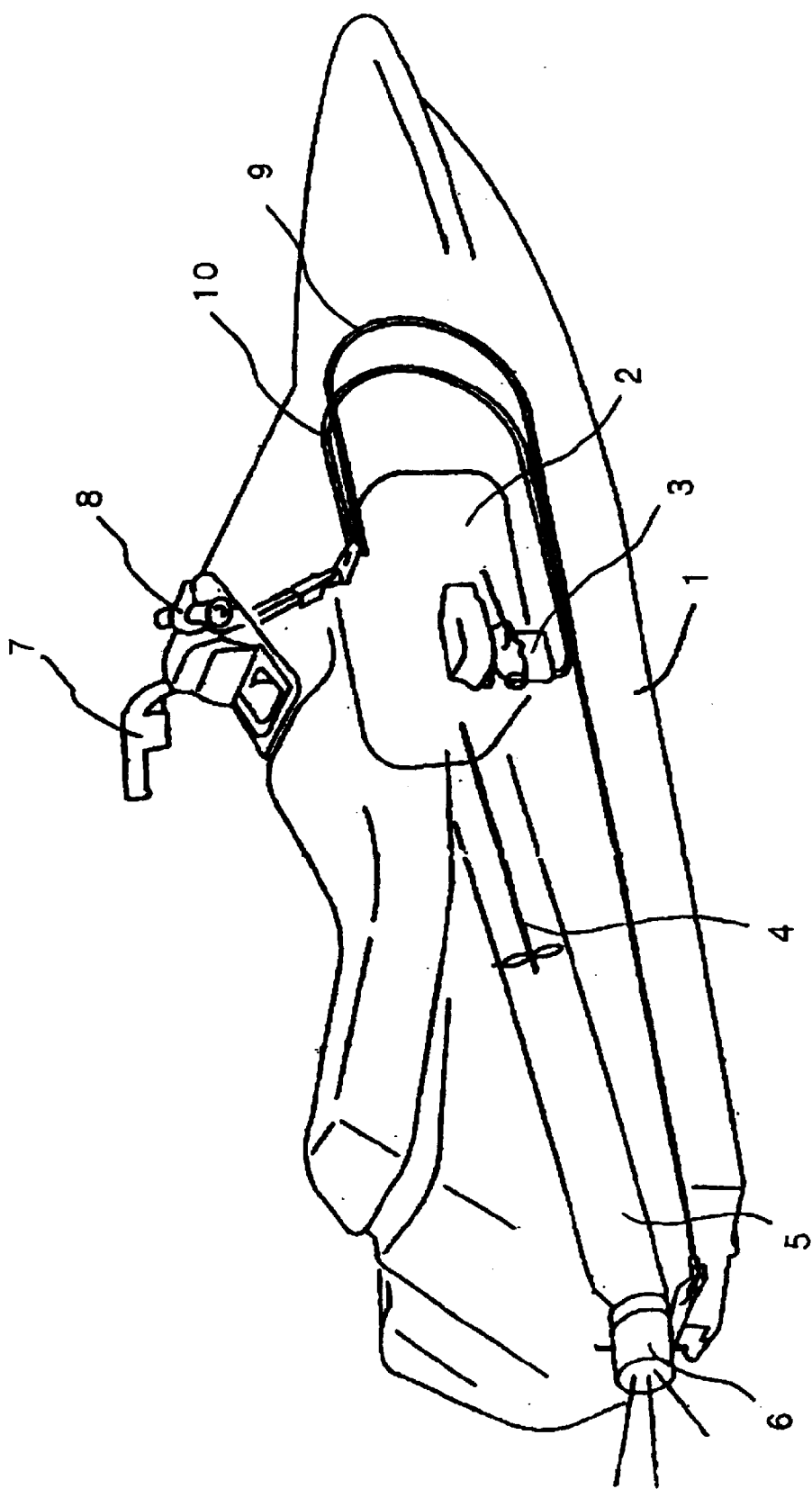
FIG. 4 is a perspective view showing the general construction of a PWC in which the conventional internal combustion engine control unit for a jet propulsion type watercraft is mounted.
Figure 5A:
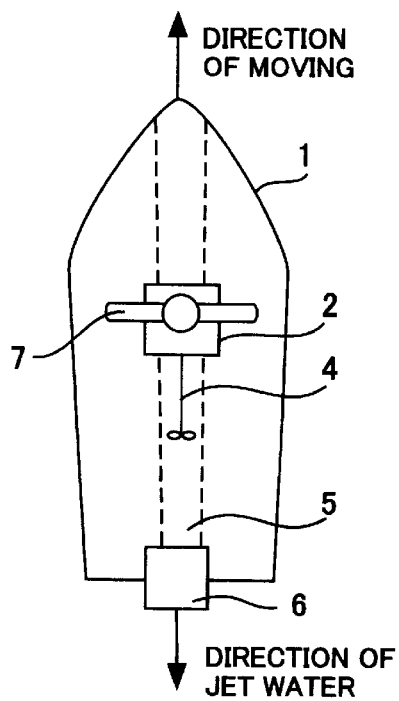
FIG. 5 is a movement view showing the steering operation for the PWC in which the internal combustion engine control unit for a jet propulsion type watercraft is mounted.
Figure 5B:
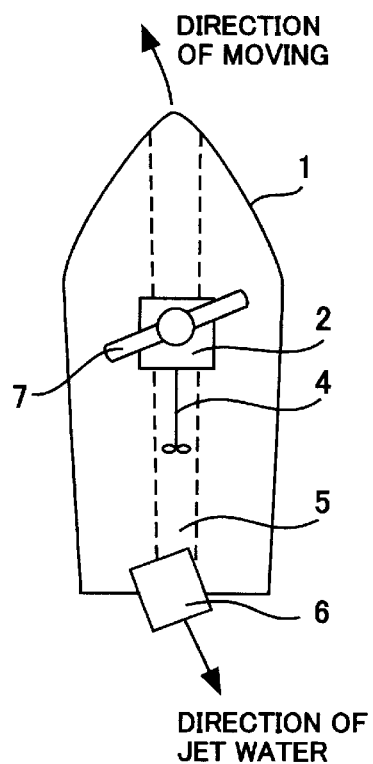
Figure 5C:
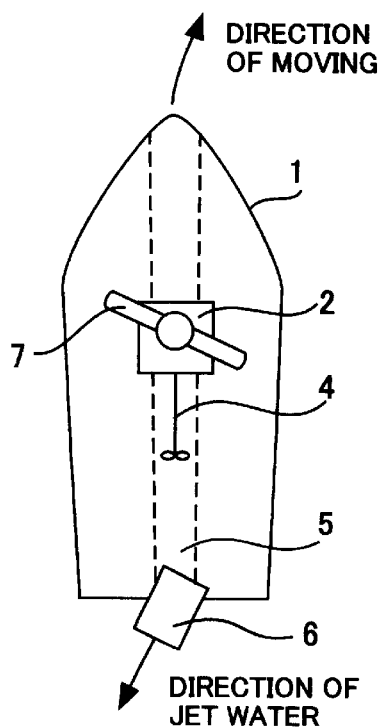

FIG. 1 is a block diagram of the configuration of an internal combustion engine control unit for a jet propulsion type watercraft according to a preferred embodiment of the present invention. FIG. 2 is a time-chart showing the movement of the internal combustion engine control unit for a jet propulsion type watercraft according to the preferred embodiment of the present invention; and FIG. 3 is a flowchart thereof. Since the basic construction of a PWC controlled by the internal combustion engine control unit according to this embodiment is identical with that described in detail in FIG. 4 of the conventional example, the description will be omitted here.

In FIG. 1, reference number 21 denotes a steering handle angle detector which detects a turning angle of the steering handle 7 to generate a risk avoidance operational signal based on the detected turning angle, and configures a risk avoidance operation detector which detects a risk avoidance operation performed by a rider. Reference number 22 denotes a throttle open degree detector which detects a throttle open degree to generate a throttle open degree signal; 23 a throttle position signal generator which generates a throttle position signal based on the throttle open degree detected by the throttle open degree detector 22. The throttle open degree detector 22 and the throttle position signal generator 23 configure a throttle operation state detector which detects the throttle operation state by the rider. In FIG. 2, which will be described below, a throttle position signal is generated under the condition where the throttle is closed fully. However, the throttle position signal may be generated when the throttle open degree is a predetermined value or below, that is, in the vicinity of the fully closed state. Furthermore, reference number 24 denotes a rotation speed signal detector which detects a rotation speed of the engine 2 to generate an engine rotation speed signal.

Reference number 25 denotes an ignition timing controller and, for example, controls an ignition coil which generates a high voltage in an ignition plug mounted in the engine 2. Reference number 26 denotes a fuel supplying amount controller which controls an amount of fuel supply and timing for supplying fuel to the engine 2 and is, for example, an injector. Reference number 27 denotes a throttle valve open degree driver which controls the throttle open degree by driving a throttle valve which adjusts an amount of intake air of the engine 2; 28 an auxiliary intake air amount controller which controls an amount of intake air (bypass intake air amount) to the engine 2.

Reference number 31a to 31d denote input circuits for inputting signals detected by the above-described various detectors to a microcomputer 30; 32a to 32d output circuits for outputting control signals to the above-described various detectors from the microcomputer 30. The microcomputer 30, the input circuits 31a to 31d and the output circuits 32a to 32d configure a controller 300.

Next, the movement will be described with reference to FIG. 2. In FIG. 2, the solid lines show the internal combustion engine control unit according to this embodiment; the broken lines show the conventional internal combustion engine control unit. In a usual running state, a rider opens the throttle so that the optimum running speed is obtained, and the engine rotation speed is a predetermined value, whereby the jet propulsion force is the optimum output. Here, the ignition timing and the fuel supplying amount are controlled by the controller 300 optimally so that the engine 2 can produce the optimum characteristics. In general, the ignition timing tends to be earlier, and the fuel supplying amount tends to be larger.

When the rider operates the steering handle 7 under the condition described above, the spouting nozzle 6 for jet water moves in cooperation with the operation of the steering handle 7, and the spouting direction of jet water changes, so that the traveling direction can be changed to the operational direction of the rider. However, when the throttle is closed while running, it is judged that the rider has operated to reduce the running speed. Then, in the conventional example as indicated by the broken lines, the ignition timing and the fuel supplying amount are controlled to reduce the engine rotation speed. Thus, the engine rotation speed is reduced to the idle rotation speed when the throttle is fully closed. The jet propulsion force is also reduced at the idle rotation speed. Accordingly, it is impossible to change the traveling direction by the steering operation even while the hull 1 is running at a certain speed by using remaining power.

On the other hand, in this embodiment as indicated by the solid lines, when the throttle is closed fully while running, that is, when the throttle position signals are changed from "0" to "1" indicating the fully closed state, the microcomputer 30 assumes that there is a higher possibility that the rider detects the risk ahead and performs a risk avoidance operation. Then, the microcomputer 30 judges it as the risk avoidance mode and controls over the risk avoidance.

The control over the risk avoidance needs to be as good in responsiveness as possible. In this embodiment, the ignition timing and the fuel supplying amount, both of which directly control the combustion state in the engine 2 through the microcomputer 30, are controlled to the optimum values, so that the engine rotation speed can be kept at a predetermined value (about 2,000 r/min). Specifically, the ignition timing and the fuel jet timing are controlled to be earlier, and the fuel supplying amount is controlled to be larger.

The engine rotation speed is smoothly kept at the predetermined value so as to keep the propulsion force of the hull. Thus, it is possible to change the traveling direction of the steering handle 7 and avoid the risk. Furthermore, there is no need for adjusting the throttle opening degree in the subtle manner. Therefore, the hull 1 can be moved and got smoothly to the shore where it needs to be stopped. Here, the ignition timing, the fuel supplying amount and the fuel jet timing may be returned to usual control values after the risk avoidance has been achieved. Then, the hull 1 can be stopped. Whether the risk avoidance has been completed or not may be judged after lapsing a predetermined period of time T after the detection of the risk avoidance operation, or when the steering handle 7 is returned.

Next, the movement by the controller 300 will be described with reference to the flowchart in FIG. 3. First, whether or not the throttle is opened by a predetermined angle or larger (that is, whether or not the throttle is nearly closed) is judged (step S1) based on throttle position signals generated from the throttle position signal generator 23 in response to the throttle open degree detected by the throttle open degree detector 22. When the throttle is opened by the predetermined angle or larger, the usual control is performed because there is a jet propulsion force enough to change the traveling direction through the operation of the steering handle 7. On the other hand, when the throttle is opened by the predetermined angle or smaller, it is judged whether or not a predetermined period of time has passed since the throttle was opened by the predetermined angle or smaller (step S2). If the predetermined period of time has passed, it is judged that the hull 1 is stopped completely. Then, since there is no need for performing the risk avoidance, the usual control is performed.

On the other hand, if the predetermined period of time has not passed since the throttle was opened by the predetermined degree or smaller, it is judged that the hull 1 is still running by a remaining power, and that the rider is performing the risk avoidance operation while the hull 1 is running, which is the risk avoidance mode. Then, control signals are output to the ignition timing controller 25 and the fuel supplying amount controller 26, and then processing for keeping the engine rotation speed at the predetermined value is performed (step S3).

According to this embodiment of the present invention, when the throttle is opened by the predetermined angle or smaller while the hull 1 is running, the ignition timing and the fuel supplying amount are controlled to keep the engine rotation speed at the predetermined value. Therefore, even while the hull 1 is running without a jet propulsion force enough to change the traveling direction by the steering handle 7, the rider can perform the risk avoidance safely by quickly adding the jet propulsion force which can change the traveling direction.

Further, since the engine rotation speed is kept for the predetermined period of time, there is no need for adjusting the throttle opening degree in the subtle manner. Therefore, even a beginner can move the hull 1 and get it smoothly to the shore where it needs to be stopped.

Further, the ignition-timing controller 25 and the fuel supplying amount controller 26 are generally built in each of current ECU's. Therefore, no additional devices for risk avoidance are needed, and the inexpensive system can be configured.

An additional device which can increase an amount of air intake to the engine 2, such as a DC motor which can force to open or close the throttle valve and a device which controls an amount of bypass intake air, may be installed and operated. Thus, needless to say, more stable operation can be performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An internal combustion engine control unit for a jet propulsion type watercraft which runs by a jet propulsion force generated by drawing and spouting water by an internal combustion engine, comprising:

throttle operation state detecting means which detects a state of the throttle operated by a rider; and controlling means which, when the throttle open degree detected by the throttle operation state detecting means is a predetermined value or lower, keeps the rotation speed of the internal combustion engine at a predetermined value for a predetermined period of time after the throttle open degree has reached the predetermined value or lower.

2. The internal combustion engine control unit for a jet propulsion type watercraft according to claim 1, further comprising ignition timing control means which controls ignition timing for the internal combustion engine and a fuel supplying amount controlling means which controls a fuel supplying amount supplied to the internal combustion engine, whereby the rotation speed of the internal combustion engine is kept at a predetermined value by using at least one of the ignition timing control means and the fuel supplying amount control means.

3. The internal combustion engine control unit for a jet propulsion type watercraft according to claim 2, wherein the ignition timing is controlled to be earlier than usual.

4. The internal combustion engine control unit for a jet propulsion type watercraft according to claim 2, wherein the fuel supplying amount is controlled to be larger than usual.

5. The internal combustion engine control unit for a jet propulsion type watercraft according to claim 3, wherein the fuel supplying amount is controlled to be larger than usual.

6. The internal combustion engine control unit for a jet propulsion type watercraft according to claim 3, wherein the fuel supplying amount is controlled by making the fuel supplying timing earlier than usual.

7. The internal combustion engine control unit for a jet propulsion type watercraft according to claim 4, wherein the fuel supplying amount is controlled by making the fuel supplying timing earlier than usual.

* * * * *